United States Patent
Yan et al.

(10) Patent No.: US 8,984,645 B2
(45) Date of Patent: Mar. 17, 2015

(54) ACCESSING MEMORY DEVICE CONTENT USING A NETWORK

(75) Inventors: Mei Yan, Cupertino, CA (US); Robert C. Chang, Danville, CA (US); Farshid Sabet-Sharghi, Los Altos Hills, CA (US); Po Yuan, Milpitas, CA (US); Bahman Qawami, San Jose, CA (US)

(73) Assignee: SanDisk Technologies Inc., Plano, TX (US)

( * ) Notice: Subject to any disclaimer, the term of this patent is extended or adjusted under 35 U.S.C. 154(b) by 1155 days.

(21) Appl. No.: 12/229,165

(22) Filed: Aug. 20, 2008

(65) Prior Publication Data

US 2010/0050241 A1     Feb. 25, 2010

(51) Int. Cl.
G06F 21/00    (2013.01)
H04L 29/06    (2006.01)
G06F 21/10    (2013.01)

(52) U.S. Cl.
CPC .............. *H04L 63/104* (2013.01); *G06F 21/10* (2013.01); *H04L 63/083* (2013.01); *H04L 63/0428* (2013.01)
USPC ................................... 726/26; 726/5; 726/31

(58) Field of Classification Search
None
See application file for complete search history.

(56) References Cited

U.S. PATENT DOCUMENTS

| | | | |
|---|---|---|---|
| 5,418,837 A | 5/1995 | Johansson et al. | |
| 7,058,818 B2 | 6/2006 | Dariel | |
| 2004/0067772 A1 | 4/2004 | Gaumain | |
| 2004/0162105 A1 | 8/2004 | Reddy et al. | |
| 2005/0026595 A1 | 2/2005 | Huckins | |
| 2006/0242068 A1 | 10/2006 | Jogand-Coulomb et al. | |
| 2007/0043667 A1 | 2/2007 | Qawami et al. | |
| 2007/0056042 A1* | 3/2007 | Qawami et al. | 726/26 |
| 2007/0094737 A1* | 4/2007 | Larsson et al. | 726/26 |
| 2007/0136509 A1 | 6/2007 | Agami | |
| 2007/0218945 A1 | 9/2007 | Agami et al. | |
| 2007/0259691 A1 | 11/2007 | Santos Garcia | |
| 2008/0010450 A1 | 1/2008 | Holtzman et al. | |
| 2008/0162947 A1 | 7/2008 | Holtzman et al. | |

(Continued)

FOREIGN PATENT DOCUMENTS

| | | |
|---|---|---|
| EP | 1 280 149 | 1/2003 |
| WO | 2007/068263 | 6/2007 |

(Continued)

OTHER PUBLICATIONS

International Search Report issued in international application No. PCT/US2009/054015, mailed on Mar. 5, 2010 (9 pages).
Written Opinion issued in international application No. PCT/US2009/054015, mailed on Mar. 5, 2010 (12 pages).

(Continued)

*Primary Examiner* — Jeffery Williams
(74) *Attorney, Agent, or Firm* — Brinks Gilson & Lione (57) ABSTRACT

A first storage unit is bound to a second storage unit based on a binding type associated with content on the first storage unit, the first storage unit being operated through a first host device, and the second storage unit being operated through a second host device. When content on the first storage unit is requested in the first host device, the first host device will calculate an account identifier based on the binding type associated with the requested content and send the account identifier to a server. The server will send the account identifier to the second host device, and the second storage unit will use the account identifier to calculate a credential. The credential will be sent to the first host device through the server. The credential can be used to access the requested content if the credential is valid.

18 Claims, 8 Drawing Sheets

(56) References Cited

U.S. PATENT DOCUMENTS

| | | | |
|---|---|---|---|
| 2008/0163336 A1* | 7/2008 | Feng et al. | 726/1 |
| 2009/0144815 A1* | 6/2009 | Vrielink et al. | 726/7 |
| 2009/0217387 A1* | 8/2009 | Kurihara et al. | 726/31 |
| 2010/0273424 A1* | 10/2010 | De Petris et al. | 455/41.2 |
| 2010/0281262 A1* | 11/2010 | Cheng et al. | 713/171 |

FOREIGN PATENT DOCUMENTS

| | | |
|---|---|---|
| WO | 2008/060467 | 5/2008 |
| WO | 2008/080431 | 7/2008 |

OTHER PUBLICATIONS

Announcement Open Mobile Alliance: DRM Architecture—Candidate Version 2.0, dated Jul. 15, 2004 (24 pages).

International Preliminary Report on Patentability issued in international application No. PCT/US2009/054015, mailed Mar. 3, 2011 (12 pages).

U.S. Appl. No. 11/967,641 entitled, "Method and System for Creating and Accessing a Secure Storage Area in a Non-Volatile Memory Card", filed Dec. 31, 2007, 44 pages.

U.S. Appl. No. 12/229,090 entitled, "Memory Device Upgrade", filed Aug. 20, 2008, 70 pages.

* cited by examiner

ACCESSING MEMORY DEVICE CONTENT USING A NETWORK

BACKGROUND

1. Field

Embodiments of the present disclosure relate to technology for secure memory devices.

2. Description of the Related Art

Semiconductor memory has become more popular for use in various electronic devices. For example, non-volatile semiconductor memory is used in cellular telephones, digital cameras, mobile media players, personal digital assistants, mobile computing devices, non-mobile computing devices and other devices.

Preventing unauthorized access to a secure non-volatile semiconductor memory device has become a greater concern as technology has advanced. An example of a secure memory device is a Subscriber Identity Module (SIM) card or a removable memory card that may contain secure content that should be protected from unauthorized use.

Protecting content stored on secure memory devices has become an important feature, especially concerning protection for copyrighted material. For example, a user may purchase copyrighted content, such as music, through an electronic device. Content owners typically intend for only the purchaser to use the content and may require that the purchased content be played only by authorized applications on an electronic device, such as the application used to purchase the content.

Securely storing information to protect against unauthorized use of secure content can be performed using a variety of protection techniques, such as encryption. An application on a device that tries to access encrypted content must decrypt the content using an encryption key before that content can be read. An application authorized to access the encrypted content will have the appropriate encryption key for decrypting the content. Unauthorized applications may still be able to access the encrypted content, but without the appropriate encryption key, the unauthorized application may not be able to read the content.

Although there are a variety of protection techniques that a secure memory device may implement, if a secure memory device that is typically operated on one device must be accessed through another memory device, the protection techniques may prevent this access. There is a need for an improved, simplified, and secure way of allowing device to access content on a secure memory device.

SUMMARY

The technology described herein pertains to accessing content on a first storage unit through a first host device. The first storage unit is bound to a second storage unit on a second host device based on binding types for the content on the first storage unit. The second storage unit is needed to calculate a credential for access to the content on the first storage unit. When content on the first storage unit is requested through the first host device, the first host device calculates an account identifier associated with the binding type for the requested content. The account identifier will be sent from the first host device to a server. The server will send the account identifier to the second host device. The second storage unit will use the account identifier to calculate a credential. The credential is then sent to the server, and the server sends the credential to the first host device. The first host device will use the credential to access the requested content if the credential is valid.

One embodiment of a process for accessing content includes determining in a first device an account identifier associated with content on a first storage unit that is operatively coupled to the first device. The account identifier is sent from the first device to a server. The first device receives a credential from a second device via the server, where the credential is based on the account identifier. The first device accesses the content using the credential if the credential is valid.

One embodiment of a process for accessing content includes receiving at a server an account identifier from a first device. The account identifier is associated with content on a first storage unit that is operatively coupled to the first device. The account identifier is sent from the server to a second storage unit that is operatively coupled to a second device. The second storage unit is associated with the first storage unit. The server receives a credential from the second storage unit in response to sending the account identifier. The credential is based on the account identifier. The server sends the credential to the first device. The credential provides access to the content on the first storage unit if the credential is valid.

One embodiment of a process for accessing content includes receiving a request to access content on a first memory card that is operatively coupled to a first device. The first memory card is bound to a second memory card based on a binding type. The second memory card is operatively coupled to a second device. The receiving is performed by a software entity on the first device. The software entity calculates an account identifier based on the binding type and sends the account identifier to the server. The software entity receives a credential from the server. The credential is generated by the second memory card based on the account identifier and the binding type. The software entity accesses the content using the credential if the credential is valid.

One embodiment of a process for accessing content includes calculating at a first device an account identifier associated with content on a first storage unit that is operatively coupled to the first device. The first storage unit is associated with a second storage unit that is operatively coupled to a second device. The account identifier is sent from the first device to the second device through a server. The second storage unit generates a credential based on the account identifier. The first device receives the credential from the second storage unit through the server and accesses the content on the first storage unit if the credential is valid.

Embodiments in accordance with the present disclosure can include one or more non-volatile storage units and one or more processors in communication with the one or more non-volatile storage units. The one or more processors can be adapted to perform one or more processes to access content in at least one non-volatile storage unit as described. Embodiments in accordance with the present disclosure can be accomplished using hardware, software or a combination of both hardware and software. The software can be stored on one or more computer readable media such as hard disk drives, CD-ROMs, DVDs, optical disks, floppy disks, tape drives, RAM, ROM, flash memory or other suitable storage device(s). In alternative embodiments, some or all of the software can be replaced by dedicated hardware including custom integrated circuits, gate arrays, FPGAs, PLDs, and special purpose processors. In one embodiment, software (stored on a storage device) implementing one or more embodiments is used to program one or more processors. The one or more processors can be in communication with the one or more non-volatile storage units in the storage system, peripherals and/or communication interfaces.

DETAILED DESCRIPTION

The disclosed technology provides access to content on a first memory device. The first memory device may be any non-volatile storage device, such as a removable non-volatile flash memory card for example. The first memory device is operatively coupled to a first host device. That is, the first memory device may be operated through a host agent on the first host device. The first host device may be any electronic device, such as a cellular telephone, digital camera, mobile media player, personal digital assistant, mobile computing device, non-mobile computing device, or any other device.

A second memory device is operatively coupled to a second host device through a host agent on the second host device. The second memory device may also be any non-volatile storage device, such as a Subscriber Identity Module (SIM) card for example. The first memory device is associated with the second memory device. In one embodiment, both memory devices can be operated through one host device using the host agent on one host device. The host agent may be any software entity on the host device and can be used to operate the memory devices through the host device, such as an application installed on the host device. The host agent allows access to the memory devices. Various processes are described herein as being performed by software entities such as host agents, applets, etc. for the sake of clarity, simplicity and to conform with the standard usage of these terms in the art. It will be appreciated that reference to software entities performing actions may include the performance of the actions by one or more devices (e.g., processors, control circuitry, etc.) under the control of the software entities.

To increase security, the first memory device and the second memory device implement security features for accessing content on the devices. The first memory device is bound to the second memory device, and access to content on the first memory device is dependent upon how the memory devices are bound together. For example, content on a memory card can include a binding type that is used to obtain a credential from a SIM card for accessing the content.

The first memory device is operatively coupled to the first host device, and the second memory device is operatively coupled to the second host device. In one embodiment, these memory devices are removable memory cards that can be inserted in the host devices. In another embodiment, the memory devices can be embedded in the host devices. In another embodiment, these memory devices are operated through the host devices, but they are not inside the devices. Throughout the description of the disclosed technology, the memory devices will be described as being operated in the host device. However, the technology is not limited to this embodiment, and the memory devices can simply be operated through the host device.

When access to content on the first memory device is requested, the host agent on the first host device calculates an account identifier associated with the requested content. The account identifier is sent to a server. The server can be operated by a network service provider for the host devices, such as a mobile network operator (MNO), or by any third-party. In one embodiment, the server is a trusted third-party (TTP) server. Throughout the description of the disclosed technology, the server will be referred to as a TTP. However, the technology is not limited to this embodiment, and any server can be used with the disclosed technology. Once the host agent sends the account identifier to the TTP, the TTP will send the account identifier to the second host device. The second memory device in the second host device will use the account identifier to calculate a credential. The credential is sent from the second host device to the server and then from the server to the host agent on the first host device. If the credential is valid, the card will allow applications on the device to access to the requested content. The card can return the login status to the host agent.

Figure 1A:
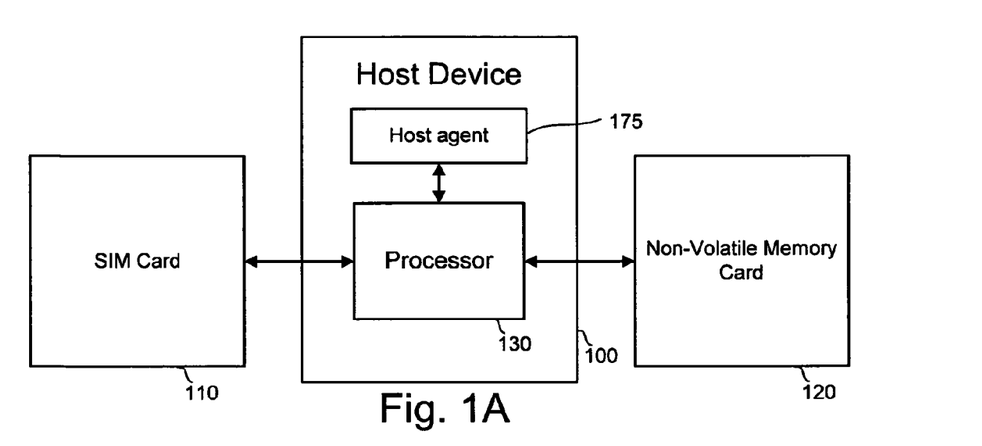
FIG. 1A is a block diagram of two memory devices in communication with a host device.

FIG. 1A depicts one example of memory devices that are bound to each other and are operated through a host agent 175 on a host device 100. As described above, the host device 100 can be any electronic device. The host device 100 contains a processor 130. The processor 130 can be any type of processor used to operate the host device 100. The processor 130 is used to access SIM card 110 and non-volatile memory card 120 through the host device 100. In one embodiment, the processor 130 executes the functions of the host agent 175 for SIM card 110 and non-volatile memory card 120.

Figure 1B:
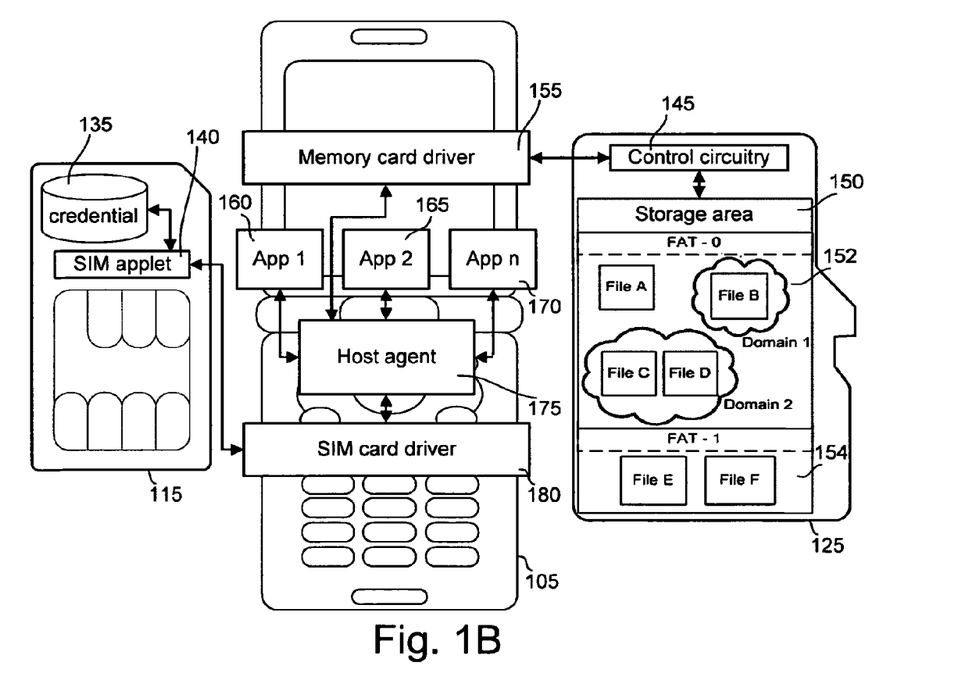
FIG. 1B is a block diagram of two memory devices in communication with a handset host device.

FIG. 1B depicts one example of the system shown in FIG. 1A. In FIG. 1B, the host device 100 is a handset 105, such as a mobile telephone or other computing device. The first memory device is a SIM card 115, and the second memory device is a removable memory card 125. The handset 105 includes a processor (not shown) as described in FIG. 1A to execute memory card driver 155, application 1 160, application 2 165, application n 170, host agent 175, and SIM card driver 180 contained on the handset 105. For simplicity, much of the disclosure references the example shown in FIG. 1B. However, the disclosed technology is not so limited.

The handset 105 has an International Mobile Equipment Identity (IMEI) number used as a unique identifier. The host agent 175 receives requests to access content on the memory card 125 and authenticates the entity attempting to access content before allowing that content to be accessed. The entity attempting to access content can be a user of the handset 105. The user may also attempt to access the content through application 1 160, application 2 165, or application n 170. These applications are also entities that may be subject to authentication before access is allowed. Application 1 160, application 2 165, or application n 170 can be any type of application, such as a media player for playing music or video files, a word processor, a calendar, etc.

The handset 105 contains a memory card driver 155 that allows the memory card 125 to be accessed through the handset 105. The handset 105 also contains a SIM card driver 180 that allows the SIM card 115 to be accessed through the handset 105.

The memory card 125 contains a storage area 150 and control circuitry 145. The storage area 150 contains the content that is stored on the memory card 125. The content is accessed through the control circuitry 145, which controls the reading and writing of content to the memory card 125. The memory card 125 also has a unique card identifier (CID) that identifies that particular memory card.

The storage area 150 can be divided into any number of public or secure partitions. Access to content in a secure partition requires valid authentication from an authorized entity. Content in a public partition can include clear content which does not require authentication and may be accessed by any entity, or protected content which requires authentication in order to be accessed. In the example shown in FIG. 1B, the storage area 150 is divided into two partitions: partition 152 and partition 154. Each partition has a File Allocation Table (FAT) which contains information about where each file is stored within the partition. FAT-0 contains information about the content stored in partition 152, and FAT-1 contains information for partition 154.

Partition 152 is one example of a secure partition. Secure partitions are hidden partitions that are undetectable to a user or a host device. Any entity attempting to access content within a secure partition must first be authenticated using the host agent 175 on the handset 105. The entity may be a user, an application on the handset 105, or a user attempting to access the content through an application on the handset 105. When an entity attempts to access content in a secure partition, the host agent 175 first accesses the file header of the content. The file header of each file is stored with the file itself and contains information about the content, such as content metadata, which may indicate what type of content is stored, information related to encrypting and decrypting the content, and information related to authentication, such as a binding type. More information about the authentication process can be found in U.S. patent application Ser. No. 12/124,450, entitled "Authentication for Access to Software Development Kit for a Peripheral Device," by Mei Yan et al., filed May 21, 2008, which is incorporated by reference herein in its entirety.

After successful authentication, the entity attempting to access the content is logged into the memory card 125 and can access content within partition 152, such as File A and logic groups Domain 1 and Domain 2. Logic groups are content groupings protected by individualized encryptions. Logic groups Domain 1 and Domain 2 are each protected by a content encryption key (CEK). All content stored within Domain 1, such as File B, is encrypted using a particular CEK associated with Domain 1, and all content stored within Domain 2, such as File C and File D, is encrypted using another CEK associated with Domain 2. Information related to the CEK for each logic group is stored in the file header of the content in the logic group. That information may be used to access the correct CEK for decrypting the content if the authenticated entity has the proper authority to access the content. If the entity does not have authority such that the correct CEK can be accessed, they may be able to access files within Domain 1 or Domain 2, but will not be able to decrypt the contents thereof. The encryption and decryption of content is performed by the control circuitry 145, which may support any encryption method such as symmetric encryption (e.g., AES, DES, 3DES, etc.), cryptographic hash functions (e.g., SHA-1, etc.), asymmetric encryption (e.g., PKI, key pair generation, etc.), or any other cryptography methods.

Partition 154 is one example of a public partition containing clear content File E and File F. Public partitions are detectable to a user or a host device. Clear content is any content that is stored in a public partition of the memory device 125 and that is not encrypted with a CEK. Any entity attempting to access clear content within a public partition may do so without authentication.

Access to any content stored on the memory device 125 is controlled using the control circuitry 145. The control circuitry allows the host agent 175 on the handset 105 to access content on the memory device 125 after the host agent 175 has successfully authenticated the entity attempting to access the content.

The SIM card 115 in FIG. 1B can be any removable integrated circuit card typically used in a cellular telephone or mobile computer. The SIM card 115 is a memory card that stores the International Mobile Subscriber Identity (IMSI), which is the identifier used to identify the subscriber of the mobile service for the handset 105. When a call is placed or data transfer initiated, the IMSI is sent from the SIM card 115 to the handset 105, and the handset 105 then sends the IMSI to the subscriber network. The subscriber network is the MNO that provides mobile service for the handset 105. When the MNO receives the IMSI from the handset 105, it allows a call to be placed or data to be transferred. The SIM card 115 also stores the Mobile Subscriber Integrated Services Digital Network (MSISDN) number, which is an identifier associated with the telephone number for the SIM card 115. The SIM card 115 is typically operated through one MNO. The MNO can be identified through a network identifier (NetID) that is unique to that particular MNO. The NetID can be any identifier for the MNO such as the Mobile Country Code (MCC) or the Mobile Network Code (MNC).

The SIM card 115 also stores applications within its memory, such as SIM applet 140. The SIM applet 140 is an application used with the host agent 175 on the handset 105 for authenticating and logging in an entity attempting to access content on the memory card 125. The SIM applet 140 will generate a credential 135 for access to content on the memory card 125 based on the binding type found in the file header for that content.

Figure 2:
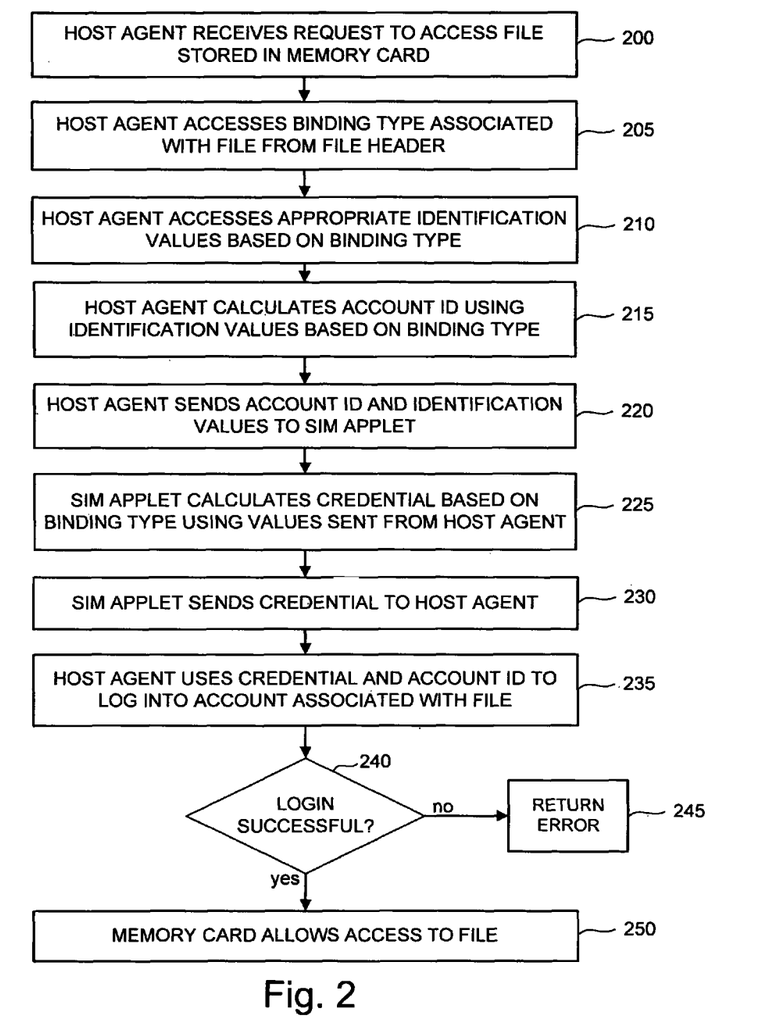
FIG. 2 is a flow chart of a process for accessing content on a memory device.

FIG. 2 is a flowchart of a process for authenticating and logging in an entity attempting to access protected content on the memory card 125. An entity attempting to access clear content in a public partition need not be authenticated for access to that content. In step 200, the host agent 175 receives a request to access a file stored in the memory card 125. In one embodiment, the request may come from a user of the handset 105. In another embodiment, the request may come from an application on the handset 105, such as application 1 160.

In step 205, the host agent 175 accesses the binding type associated with the requested content from the file header of the requested file. All protected content stored in the memory card 125 has a particular binding type associated with it. The binding type can be found in the file header for the content. The binding type indicates how the content in the memory card 125 is bound to the SIM card 115 by indicating that a particular identifier should be used to calculate the credential needed for access to the content. The memory card 125 can be bound to the SIM card 115 based on one or more binding types for the content stored in the memory card 125. For example, the binding type may indicate an identifier for the SIM card 115 (i.e. SIM card binding), the handset 105 (i.e. handset binding), the memory card 125 (i.e. memory card binding), or the MNO for the handset 105 (i.e. network binding).

Once the binding type has been determined from the file header of the requested file (step 205), the host agent 175 accesses the appropriate identification values based on the binding type in step 210. If the binding type is SIM card binding, the host agent 175 accesses the appropriate SIM card identification value from the SIM card 115. In one embodiment, the identification value for SIM card binding is the IMSI number. In another embodiment, the identification value for SIM card binding is the MSISDN number. If the binding type is handset binding, the host agent 175 accesses the appropriate handset identification value from the handset 105. In one embodiment, the identification value for handset binding is the IMEI number. If the binding type is memory card binding, the host agent 175 accesses the appropriate memory card identification value from the memory card 125. In one embodiment, the identification value for memory card binding is the CID. If the binding type is network binding, the host agent 175 accesses the appropriate network identification value from the MNO using the telecommunication capabilities of the handset 105. In one embodiment, the identification value for network binding is the NetID.

After the host agent 175 accesses the appropriate identification value based on the binding type of the requested content, the host agent 175 uses that identification value to calculate an account identifier based on the binding type (step 215). The host agent 175 has the binding rules that are used to calculate the account identifier. The binding rules are stored at the host agent 175. In one embodiment, the binding rules are also stored with the content. The binding rules may indicate a particular algorithm for the calculation and can be specific to each binding type or they can be the same for any of the binding types. The account identifier can be calculated by inputting the identification value (and possibly other values specified by the binding rules) in the particular algorithm associated with the binding rules. In one embodiment, the particular algorithm is a cryptographic function. Cryptographic functions are functions that input one or more values and return another value, wherein the other value serves as a representation or fingerprint of the one or more inputted values. Any cryptography method can be used, including by way of non-limiting example, symmetric encryption (e.g., AES, DES, 3DES, etc.), cryptographic hash functions (e.g., SHA-1, etc.), or asymmetric encryption (e.g., PKI, key pair generation, etc.).

The host agent 175 sends the account identifier calculated in step 215 and the identification values accessed in step 210 to the SIM applet 140 in the SIM card 115 (step 220). The SIM applet then uses either or both the account identifier and the identification values to calculate a credential 135 based on the binding type (step 225). The binding rules for the binding type indicate how the credential is calculated, specifying for example, that a particular algorithm, such as a cryptographic function, is to be used. The binding rules are stored in the SIM applet 140. The SIM applet 140 calculates the credential 135 using the account identifier and also possibly the identification values in the algorithm specified by the binding rules. The SIM applet 140 will save the calculated credential 135 in the SIM card 115 memory.

Once the credential 135 is calculated by the SIM applet 140, the SIM applet 140 sends the credential to the host agent 175 (step 230). The host agent 175 uses the credential 135 received in step 230 and the account identifier calculated in step 215 to log in to an account that is associated with the requested file (step 235). Each protected file in the memory card 125 is associated with permissions that indicate which entities are allowed to access that file by indicating the account identifiers that are allowed to access the file. In step 240, the control circuitry 145 determines whether the account associated with the account identifier may access the content and whether the credential 135 is valid for that account. If the account identifier and the credential 135 are not valid, access is denied. The host agent receives the login status from the control circuitry and returns an error to the entity requesting the content (step 245). If the account identifier 175 and the credential 135 are valid, the host agent 175 allows access to the requested file (step 250).

Figure 3:
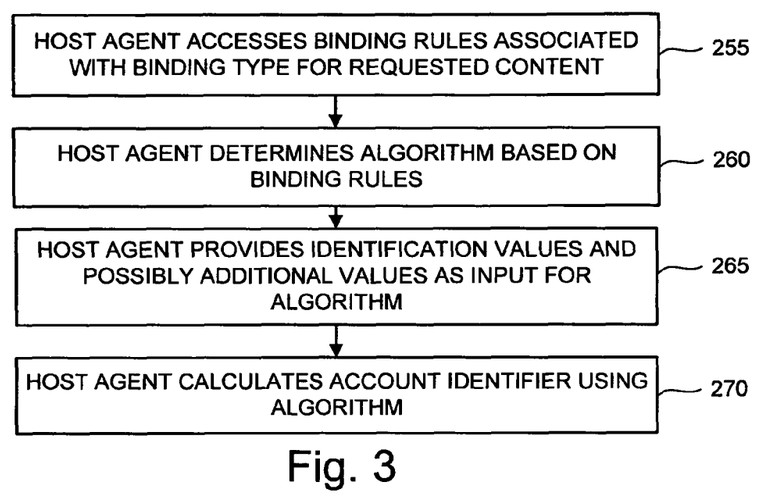
FIG. 3 is a flow chart of a process for calculating an account identifier.

FIG. 3 is a flow chart of a process for calculating the account identifier, as described in step 215 of FIG. 2. In step 255, the host agent 175 accesses the binding rules associated with the binding type for the requested content. The binding rules are stored at the host agent 175. The host agent 175 determines the algorithm to use for the calculation of the account identifier (step 260). The algorithm is specified by the binding rules. The host agent 175 provides the identification values accessed in step 210 of FIG. 2 as the input for the algorithm (step 265). In one embodiment, additional values may be used for the input as well, as specified by the binding rules. The host agent 175 calculates the account identifier by executing the algorithm with the inputs (step 270).

Figure 4:
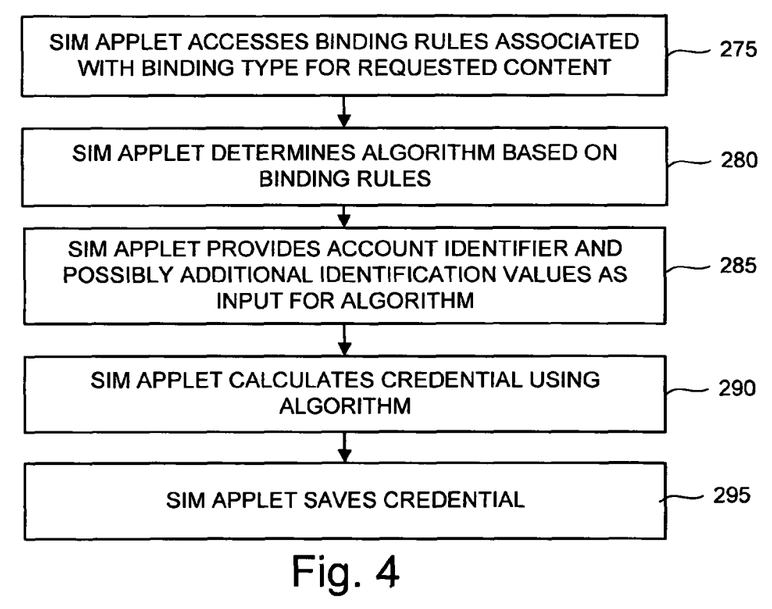
FIG. 4 is a flow chart of a process for calculating a credential.

FIG. 4 is a flow chart of a process for calculating the credential 135, as described in step 225 of FIG. 2. In step 275, the SIM applet 140 accesses the binding rules associated with the binding type for the requested content. The binding rules are stored at the SIM applet 140. The SIM applet 140 determines the algorithm to use for the calculation of the credential 135 (step 280). The algorithm is specified by the binding rules. The SIM applet 140 provides the account identifier as the input for the algorithm (step 285). In one embodiment, additional identification values may be used for the input as well, as specified by the binding rules. The SIM applet 140 calculates the credential 135 by executing the algorithm with the inputs (step 290). The SIM applet 140 also saves the credential 135 in the SIM card 115 (step 295).

Figure 5:
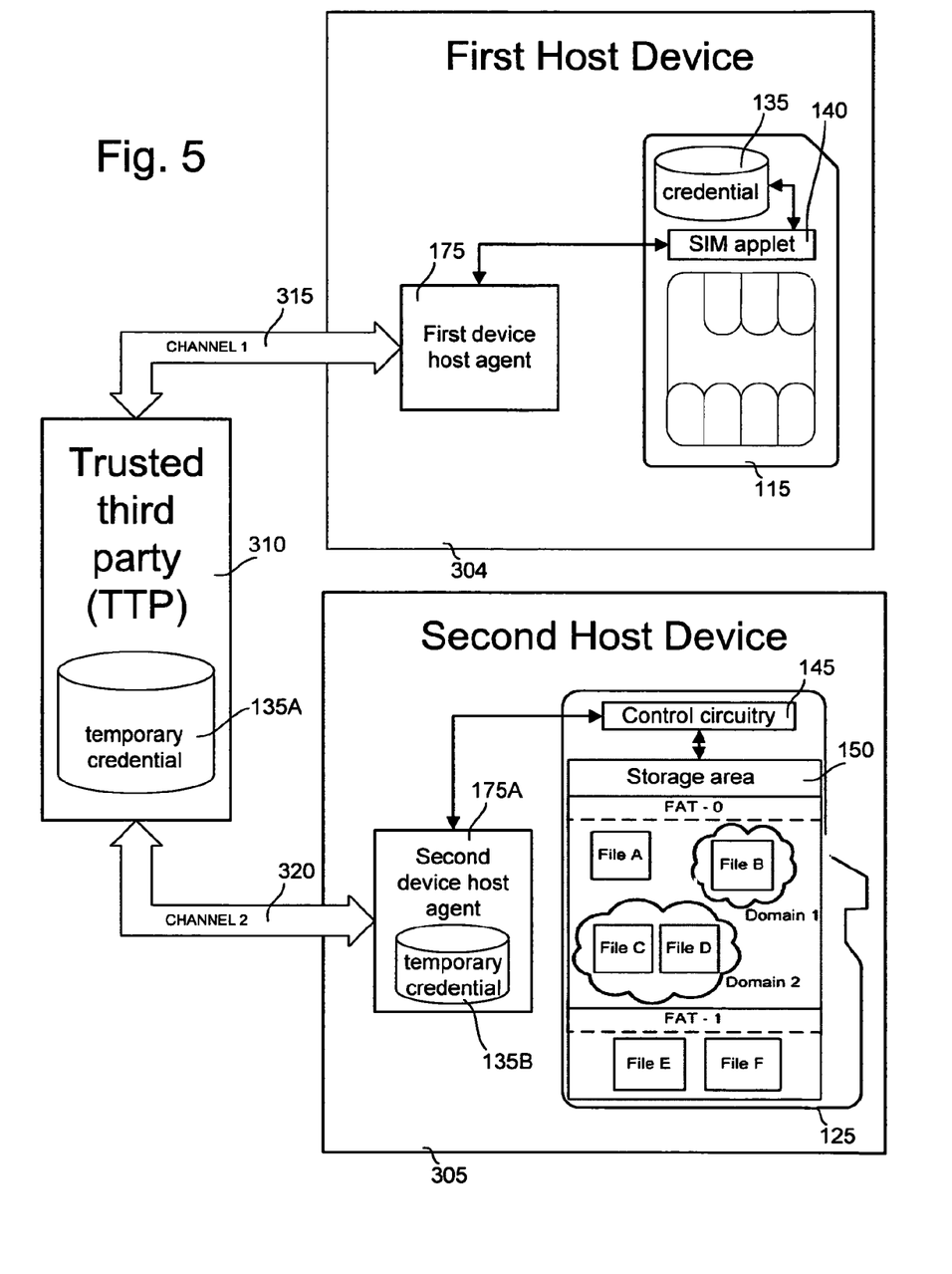
FIG. 5 is a block diagram of a device in communication with a trusted third-party server used for accessing a credential on a handset device.

As described in FIG. 2, access to content on the memory card 125 in the handset 105 requires a credential from the SIM card 115 in the handset 105. Typically, access occurs through one host device (e.g. handset 105). However, if a user operates the memory card 125 on a device other than the device on which the SIM card 115 operates, the credential should be accessed from the SIM card 115 on the handset 105. FIG. 5 depicts a block diagram of one system used to access content on a memory card in a first host device 304, wherein the memory card is bound to a SIM card operated in a second host device 305. The system includes the first host device 105, which operates the SIM card 115 using the first device host agent 175. A second host device 305 operates the memory card 125 through a second device host agent 175A on the second host device 305. The first and second host devices 304 and 305 may be any electronic device, such as a mobile telephone, a media player, a mobile computing device, a non-mobile computing device, a personal digital assistant, or any other device. The two devices need not be of the same type. The host agent 175A on the second host device 305 is similar to the host agent 175 on the first host device 304, both of which are as described in FIG. 2. A TTP 310 is used to access a credential 135 from the SIM card 115 on the first host device 105 so that the second host device 305 may use that credential 135 to access content on the memory card 125. The TTP 310 can be any server, such as a trusted third-party server for example. The second host device 305 communicates with the TTP 310 through channel 2 320. The handset 105 communicates with the TTP 310 using channel 1 315.

When an entity requests access to content on the memory card 125 through the host agent 175A on the second host device 305, the host agent 175A accesses the binding type associated with the requested content in the storage area 150 through the control circuitry 145 and calculates an account identifier based on the binding type, as described in FIG. 2.

Once the account identifier is calculated, the host agent 175A sends the account identifier to the TTP 310 through channel 2 320. Channel 2 320 is a secure channel that may transmit data over-the-air (OTA) using telecommunication capabilities of the second device 305 if the second device 305 is capable of doing so. Channel 2 320 may also transmit data through the internet or other network if the second device 305 is capable of accessing the internet or other network. A secure channel facilitates transmission of data that is encrypted before it is sent through the channel and decrypted after it is received through the channel to prevent another entity from acquiring the data during transmission through the channel. A secure channel is created by initiating a session for transmission. The session is assigned a session ID. Each session ID is associated with a session key, which is an encryption key used to encrypt the data to be transmitted. The session IDs and their corresponding session keys may be located in a reference table maintained by the host agent 175A. Before the account identifier is sent from the host agent 175A to the TTP 310, the host agent 175A opens a session by assigning a session ID to the session. The host agent 175A encrypts the account identifier using the session key associated with the session ID for that session. The host agent 175A sends the session ID to the TTP 310 and then transmits the encrypted account identifier to the TTP 310 through channel 2 320. The TTP 310, as well as the host agent 175, maintains a reference table for the session IDs similar to that maintained by the host agent 175A. The TTP 310 can use the session ID sent by the host agent 175A to decrypt the received account identifier using the session key associated with that session ID. The encryption and decryption of content for a secure channel is performed by the host agent 175A, host agent 175, or TTP 310, which may support any encryption methods such as symmetric encryption (e.g., AES, DES, 3DES, etc.), cryptographic hash functions (e.g., SHA-1, etc.), asymmetric encryption (e.g., PKI, key pair generation, etc.), or any other cryptography methods.

Once the TTP 310 receives the account identifier from the device host agent 175A, the TTP 310 sends the account identifier to the handset host agent 175 through channel 1 315. Channel 1 315 is also a secure channel which may transmit data OTA using the telecommunication capabilities of the handset 105. TTP 310 may decrypt the account identifier received from the second device 305 and re-encrypt for transmission to handset 105.

The handset host agent 175 directs the SIM applet 140 to calculate the credential 135 using the account identifier for the requested content. When the credential 135 is calculated, the host agent 175 sends the credential to the TTP 310 through secure channel 1 315.

Once the TTP 310 receives the credential 135 from the host agent 175, the TTP 310 stores a temporary credential 135A at the TTP for a limited amount of time. The temporary credential 135A is stored so that the second device 305 may access the content again during the limited amount of time by providing the account identifier to the TTP 310, and the TTP 310 will not have to request the credential 135 from the SIM card 115 on the first host device 304 again.

The TTP 310 sends the credential 135 to the host agent 175A on the other device 305 through secure channel 2 320. In one embodiment, the host agent 175A uses the credential 135 to access the content, as described in FIG. 2. The device host agent 175A also stores a temporary credential 135B for a limited amount of time as well so that the content may be accessed during the limited amount of time without having to recalculate another account identifier or credential 135. In one embodiment, the temporary credential 135B is stored by the device host agent 175A until the second device 305 is turned off.

Figure 6:
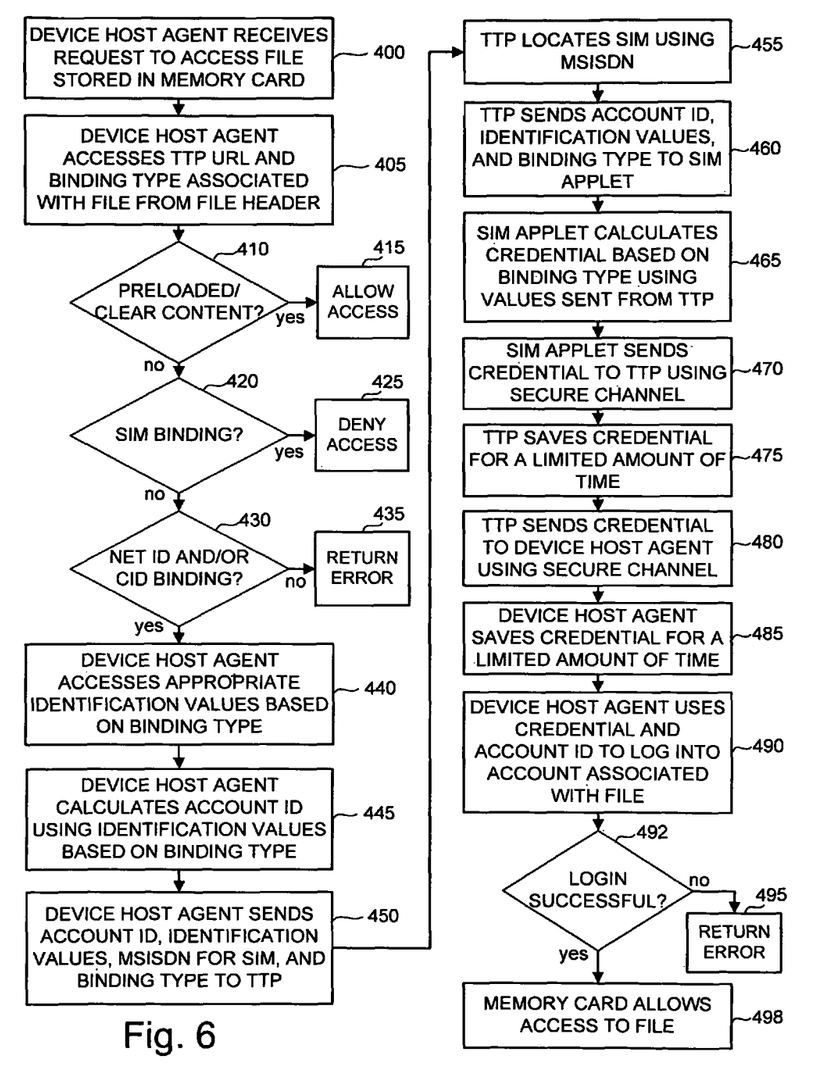
FIG. 6 is a flow chart of a process for accessing a credential for content through a network.

FIG. 6 is a flowchart of a process for accessing the content in a system similar to that shown in FIG. 5. In step 400, the device host agent 175A on the second device 305 receives a request to access a file in the storage area 150 of the memory card 125 on the second device 305. When this request is received, the device host agent 175A accesses the file header of the requested content through the control module 145 of the memory card 125. The file header stores the binding type for the content, the location of the TTP 310, such as a Universal Resource Locator (URL) for the location of the TTP 310 for example, as well as the MSISDN of the SIM card 115 that is bound to the memory card 125. The device host agent 175A may access the binding type associated with the content, the TTP 310 location, and the MSISDN in step 405.

In step 410, the device host agent 175A determines whether the requested content is preloaded or clear content. Preloaded content is preloaded onto the memory card 125 by the memory card 125 manufacturer. Preloaded content may be unprotected content or protected content stored in a public partition of the memory card 125. Clear content is similar to preloaded content except that the content is not preloaded onto the memory card 125. Clear content may be unprotected content stored in a public partition of the memory card 125. If the host agent 175A determines that the requested content is preloaded content, the host agent 175A allows the requesting entity to access the content (step 415).

If the host agent 175A determines that the requested content is not preloaded or clear content, the host agent determines whether the binding type accessed in step 405 is SIM card binding (step 420). Typically, content that is bound to the SIM card 115 can only be accessed when the memory card 125 is operated with the SIM card 115 on the same device. If the requested content has a SIM card binding type, the host agent 175A denies access to the content (step 425).

If the requested content is not bound to the SIM card 115, the host agent 175A determines whether the requested content has either a NetID or a CID binding type (step 430). If the requested content is not bound to the MNO or to the memory card 125, the host agent 175A returns an error to the requesting entity (step 435). If the requested content is bound to the MNO or the memory card 125, the device host agent 175A accesses the appropriate identification values based on the binding type (step 440). For example, if the requested content is bound to the MNO, an identification value for the MNO (e.g. MCC, MNC) is accessed. If the requested content is bound to the memory card 125, an identification value for the memory card 125 (e.g. CID) is accessed.

In step 445, the device host agent 175A uses the accessed identification value to calculate an account identifier based on the binding type. The account identifier is calculated as described in step 215 of FIG. 2 and in FIG. 3. The device host agent 175A locates the TTP 310 using the TTP location accessed in step 405 and sends the account identifier, the identification values accessed in step 440, the MSISDN accessed in step 405, and the binding type accessed in step 405 to the TTP 310 through secure channel 2 320 (step 450). The device host agent 175A may use an API to send the information to the TTP 310 and request the credential 135. An example of the API may be a GetCredential command which contains the following parameters: CID, NetID (which may be "null" if the requested content is not bound to the MNO), MSISDN, and the account identifier. The host agent 175A may use this API command to transfer the data to the TTP 310 through secure channel 2 320 by assigning a session ID for the data. Additionally, the TTP 310 maintains a database that may store the information, such as the CID, NetID, MSISDN, the account identifier, etc.

The TTP 310 uses the MSISDN to locate the handset 105 with the SIM card 115 (step 455). Once the SIM card 115 is located, the TTP 310 sends the account identifier, the identification values (e.g. NetID, CID), and the binding type to the host agent 175 on the handset 105 through the secure channel 1 315, and the host agent 175 sends the information to the SIM applet 140 on the SIM card 115 (step 460). In step 465, the SIM applet 140 uses the received information to calculate the credential 135 based on the binding-type of the requested content. The credential 135 is calculated as described in step 225 of FIG. 2 and in FIG. 4. After the credential 135 is calculated, the SIM applet 140 sends the credential 135 to the TTP 310 using secure channel 1 315 (step 470).

Once the TTP 310 receives the credential 135, the TTP 310 saves a temporary credential 135A for a limited amount of time (step 475). The temporary credential 135A is stored in the database that is maintained at the TTP 310. That is, the temporary credential 135A and the time the temporary credential 135A should be deleted from the TTP 310 is maintained in the database with the CID, NetID, MSISDN, and account identifier.

The TTP 310 sends the credential 135 to the device host agent 175A on the other device 305 using secure channel 2 320 (step 480). The device host agent 175A decrypts the received credential sent through the secure channel and saves a temporary credential 135B in the host agent 175A for a limited amount of time (step 485). After the limited amount of time, the device host agent 175A deletes the temporary credential 135B. The device host agent 175A uses the credential 135 and the account identifier to attempt to log in to the account associated with the requested content (step 490). The device host agent 175A determines whether the log in was successful (step 495). That is, the device host agent 175A determines whether the credential is valid for the account associated with the account identifier. If the credential is not valid, the device host agent 175A returns an error to the requesting entity (step 495). If the credential is valid, the device host agent 175A accesses the requested content from the memory card 125 (step 498).

Figure 7:
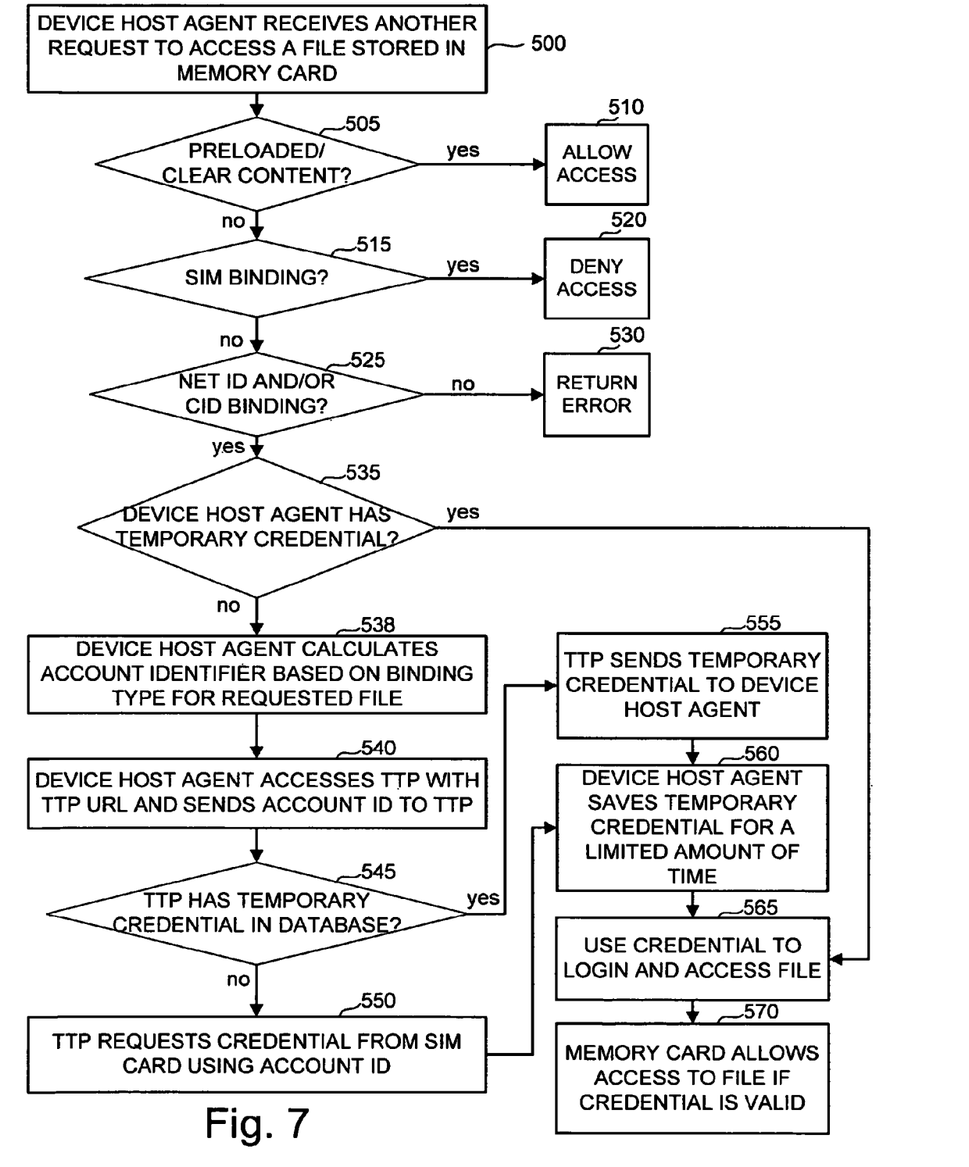
FIG. 7 is a flow chart of a process for accessing a credential for content.

FIG. 7 is a flowchart of a process for accessing other content in the memory card 125 on the second device 305 after a credential for that content has previously been requested. The previous request for content may be similar to that described in FIG. 6. In step 500 in FIG. 7, the device host agent 175A on the second device 305 receives another request to access a file stored in the memory card 125. The device host agent 175A determines whether the requested content is preloaded or clear content (step 505). If the requested content is preloaded or clear content, the device host agent 175A allows access to that content (step 510). If the requested content is not preloaded or clear content, the device host agent 175A determines whether the requested content has a SIM card binding type (step 515). If the requested content is bound to the SIM card 115, the device host agent 175A denies access to the requested content (step 520). If the requested content is not bound to the SIM card 115, the device host agent 175A determines whether the requested content is bound to the MNO or the memory card 125 (step 525). If the requested content is not bound to the MNO or the memory card 125, the device host agent 175A returns an error to the requesting entity (step 530).

If the device host agent 175A determines that the requested content is bound to the MNO or the memory card 125, the device host agent 175A determines whether the device host agent 175A already has a temporary credential 135B stored (step 535). If the device host agent 175A already has the temporary credential 135B, the device host agent 175A uses the temporary credential 135B to attempt to login and access the file (step 565). The memory card 125 allows the device host agent 175A to access the file if the credential is valid (step 570).

If the device host agent 175A does not have a temporary credential 135B stored for the requested content, the device host agent 175A calculates an account identifier based on the binding type for the requested content (step 538). This is similar to steps 440-445 in FIG. 6. The device host agent 175A accesses the TTP 310 using the TTP location that is stored in the file header for the requested content and sends the account identifier to the TTP 310 through secure channel 2 320 (step 540).

The TTP 310 checks if the account identifier received from the device host agent 175A is already stored in the TTP database with a temporary credential 135A (step 545). If the TTP 310 already has the temporary credential 135A associated with the account identifier, the TTP 310 sends the temporary credential 135A to the device host agent 175A through secure channel 2 320 (step 555). The device host agent 175A uses the received credential 135A to store a temporary credential 135B in the device host agent 175A for a limited amount of time (step 560). The device host agent 175A uses the temporary credential 135A to attempt to log into the account associated with the account identifier to access the file (step 565). The memory card allows the device host agent 175A to access the file if the credential is valid (step 570).

If the TTP 310 does not have a temporary credential 135A stored in its database, the TTP 310 uses the account identifier received in step 540 to request the credential from the SIM card 115 (step 550). That is, steps 455-480 of FIG. 6 should be performed since a credential has not previously been requested for the requested content. The TTP 310 obtains the credential 315 from the handset 105, saves the temporary credential 135A at the TTP 310, and sends the credential to the second device 305 (see FIG. 6, steps 455-480 for more detail). The device host agent 175A on the other device 305 saves a temporary credential 135B for a limited amount of time (step 560), attempts to log in and access the file using the credential (step 565), and accesses the file if the credential 135 is valid (step 570).

Figure 8:
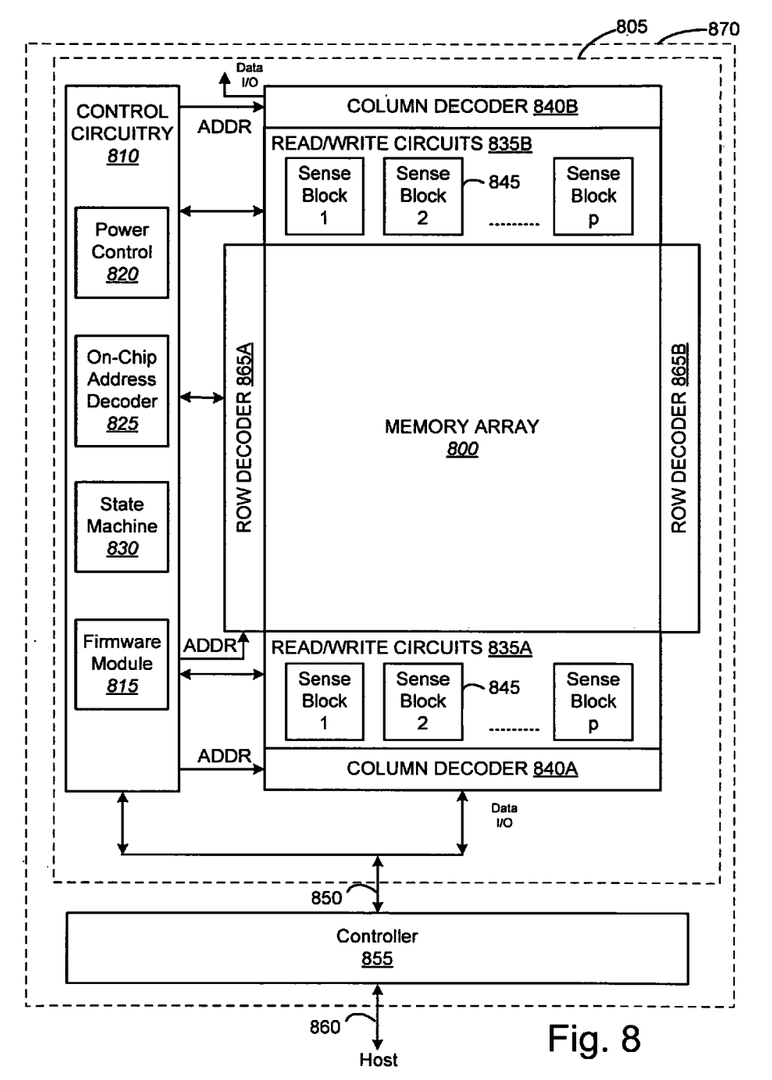
FIG. 8 is a block diagram of a memory device.

FIG. 8 illustrates a memory device 870 having read/write circuits for reading and programming a page of memory cells (e.g., NAND multi-state flash memory) in parallel. For example, the memory device 870 can be the SIM card 115 or the memory card 125. Memory device 870 may include one or more memory die or chips 805. Memory die 805 includes an array (two-dimensional or three dimensional) of memory cells 800, control circuitry 810, and read/write circuits 835A and 835B. In one embodiment, access to the memory array 800 by the various peripheral circuits is implemented in a symmetric fashion, on opposite sides of the array, so that the densities of access lines and circuitry on each side are reduced by half. The read/write circuits 835A and 835B include multiple sense blocks 845 which allow a page of memory cells to be read or programmed in parallel. The memory array 800 is addressable by word lines via row decoders 865A and 865B and by bit lines via column decoders 840A and 840B. In a typical embodiment, a controller 855 is included in the same memory device 870 (e.g., a removable storage card or package) as the one or more memory die 805. Commands and data are transferred between the host and controller 855 via lines 860 and between the controller and the one or more memory die 805 via lines 850.

Control circuitry 810 cooperates with the read/write circuits 835A and 835B to perform memory operations on the memory array 800. The control circuitry 810 includes a firmware module 815, a state machine 830, an on-chip address decoder 825 and a power control module 820. The firmware module 815 provides the security features of the memory device 870, such as encryption and decryption for example. The state machine 830 provides chip-level control of memory operations. The on-chip address decoder 825 provides an address interface between that used by the host or a memory controller to the hardware address used by the decoders 840A, 840B, 865A, and 865B. The power control module 820 controls the power and voltages supplied to the word lines and bit lines during memory operations. In one embodiment, power control module 820 includes one or more charge pumps that can create voltages larger than the supply voltage.

In one embodiment, one or any combination of control circuitry 810, power control circuit 820, decoder circuit 825, state machine circuit 830, firmware module 815, decoder circuit 840A, decoder circuit 840B, decoder circuit 865A, decoder circuit 865B, read/write circuits 835A, read/write circuits 835B, and/or controller 855 can be referred to as one or more managing circuits. The one or more managing circuits can perform memory access processes as described herein.

Figure 9:
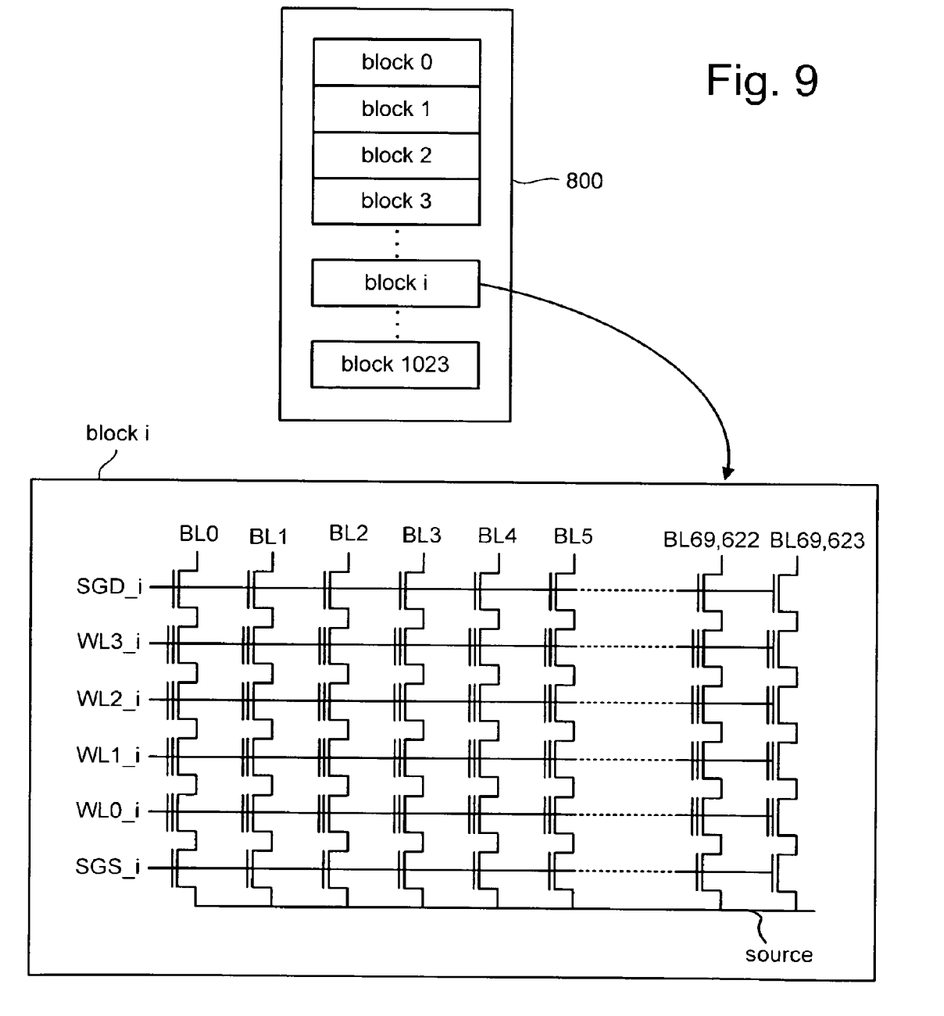
FIG. 9 is a block diagram depicting one embodiment of a memory array.

FIG. 9 depicts an exemplary structure of memory cell array 800. In one embodiment, the array of memory cells is divided into a large number of blocks (e.g., blocks 0-1023, or another amount) of memory cells. As is common for flash EEPROM systems, the block can be the unit of erase. Each block contains the minimum number of memory cells that are erased together. Other units of erase can be used as well.

A block contains a set of NAND stings which are accessed via bit lines (e.g.; bit lines BL0-BL69623) and word lines (WL0, WL1, WL2, WL3). FIG. 9 shows four memory cells connected in series to form a NAND string. Although four cells are shown to be included in each NAND string, more or less than four can be used (e.g., 16, 32, 64, 128 or another number or memory cells can be on a NAND string). One terminal of the NAND string is connected to a corresponding bit line via a drain select gate (connected to select gate drain line SGD), and another terminal is connected to the source line via a source select gate (connected to select gate source line SGS).

In one embodiment, the bit lines are divided into odd bit lines and even bit lines. In an odd/even bit line architecture, memory cells along a common word line and connected to the odd bit lines are programmed at one time, while memory cells along a common word line and connected to even bit lines are programmed at another time. In another embodiment, all memory cells connected to a common word line are programmed together.

Each block is typically divided into a number of pages. In one embodiment, a page is a unit of programming. One or more pages of data are typically stored in one row of memory cells. For example, one or more pages of data may be stored in memory cells connected to a common word line. A page can store one or more sectors. A sector includes user data and overhead data (also called system data). Overhead data typically includes header information and Error Correction Codes (ECC) that have been calculated from the user data of the sector. The controller (or other component) calculates the ECC when data is being programmed into the array, and also checks it when data is being read from the array. Alternatively, the ECCs and/or other overhead data are stored in different pages, or even different blocks, than the user data to which they pertain. A sector of user data is typically 512 bytes, corresponding to the size of a sector in magnetic disk drives. A large number of pages form a block, anywhere from 8 pages, for example, up to 32, 64, 128 or more pages. Different sized blocks, pages and sectors can also be used.

The foregoing detailed description of various embodiments is not intended to be exhaustive or to limit the invention to the precise form disclosed. Many modifications and variations are possible in light of the above teaching. The described embodiments were chosen in order to best explain the principles of the invention and its practical application, to thereby enable others skilled in the art to best utilize the invention in various embodiments and with various modifications as are suited to the particular use contemplated. The foregoing description is not intended to thereby limit the scope of the invention as recited in claims appended hereto.

What is claimed is:

1. A method for accessing content, comprising:
wherein a first storage unit is associated with a second storage unit based on one or more identification values, the first storage unit being operatively coupled with a first device and the second storage unit being operatively coupled to a second device;
accessing a binding type stored in a file header of the content, the binding type indicating how content in the first storage unit is associated with the second storage unit by indicating one or more identifiers, corresponding to the one or more identification values, that should be used to calculate one or more credentials required to access the content in the first storage unit and by identifying an algorithm to calculate the one or more credentials required to access the content in the first storage unit based on the one or more identification values;
identifying, based on the binding type, the one or more identifiers, corresponding to the one or more identification values, for use in calculating the one or more credentials required to access the content in the first storage unit;
identifying, based on the binding type, the algorithm for calculating the one or more credentials required to access the content in the first storage unit;
calculating in the first device an account identifier based on the one or more identifiers of the binding type and based on the algorithm of the binding type for calculating the one or more credentials required to access the content in the first storage unit, the account identifier associated with the content stored in three-dimensional memory of the first storage unit;
sending the account identifier from the first device to a server;
receiving in the first device a credential from the second device via the server, the credential being calculated using the algorithm identified in the binding type based on the account identifier; and
accessing in the first device the content in the first storage unit using the credential received from the second device via the server if the credential is valid.

2. The method of claim 1, further comprising:
preventing access to the content if the one or more identification values is an identifier associated with the second storage unit.

3. The method of claim 1, wherein the one or more identification values comprise an identifier associated with the first storage unit.

4. The method of claim 1, wherein the one or more identification values comprise an identifier associated with a network service provider.

5. The method of claim 1, further comprising:
receiving in the first device a request to access the content, the step of determining an account identifier being performed in response to the receiving the request.

6. The method of claim 1, further comprising:
determining in the first device whether the credential is valid.

7. The method of claim 1, further comprising:
accessing other content associated with the account identifier if the credential is valid, the accessing being performed by the first device.

8. The method of claim 7, further comprising:
storing the credential for a limited amount of time in the first device, the step of accessing other content is performed during the limited amount of time; and
deleting the credential after the limited amount of time.

9. The method of claim 1, wherein the step of receiving in the first device the credential comprises:
receiving an encrypted version of the credential; and
decrypting the encrypted version of the credential.

10. The method of claim 1, further comprising:
returning an error if the credential is invalid.

11. The method of claim 1, wherein the account identifier is sent to the server through an internet connection; and
wherein the credential is received from the server through the internet connection.

12. The method of claim 1, wherein the account identifier is sent to the server through a mobile network; and
wherein the credential is received from the server through the mobile network.

13. The method of to claim 1, further comprising:
accessing a server address from the content; and
locating the server using the server address.

14. The method of claim 1, wherein the first storage unit is a removable non-volatile flash memory card.

15. The method of claim 1, wherein the second storage unit is a Subscriber Identity Module card.

16. A method for accessing content, comprising:
receiving with a software entity on a first device a request to access content stored in three-dimensional memory of a first memory card operatively coupled to the first device, the first memory card being bound to a second memory card based on a binding type stored in a file header of the content, wherein the binding type indicates how the content on the first memory card is associated with the second memory card by indicating at least an identifier that should be used to calculate one or more credentials required to access the content on the first memory card and by identifying an algorithm to calculate the one or more credentials required to access the content in the first storage unit based on the at least the identifier, and wherein the second memory card is operatively coupled to a second device;

identifying, on the first device, based on the binding type, at least the identifier for use in calculating the one or more credentials required to access the content in the first storage unit;

identifying, on the first device based on the binding type, the algorithm for calculating the one or more credentials required to access the content in the first storage unit based on the at least the identifier;

calculating with the software entity an account identifier based on the algorithm of the binding type for calculating the one or more credentials required to access the content in the first storage unit based at least the identifier;

sending the account identifier from the software entity to a server;

receiving a credential from the server at the software entity, the credential being generated by the second memory card based on the account identifier and the algorithm identified in the binding type; and accessing with the software entity the content using the credential if the credential is valid.

17. The method of claim 16, further comprising:
accessing other content associated with the account identifier if the credential is valid.

18. The method of claim 16, further comprising:
accessing the credential from the server during a limited amount of time.

* * * * *